United States Patent [19]

Rayis

[11] Patent Number: 5,053,906
[45] Date of Patent: Oct. 1, 1991

[54] SERVICE CASSETTE FOR VHS VIDEO CASSETTE RECORDER

[76] Inventor: Yousif I. Rayis, 1720 Westwood, Madison Heights, Mich. 48071

[21] Appl. No.: 488,913

[22] Filed: Mar. 6, 1990

[51] Int. Cl.⁵ .......................... G11B 23/02; G11B 5/41
[52] U.S. Cl. ..................................... 360/137; 360/132
[58] Field of Search ......................... 360/128, 132, 137

[56]     References Cited
    U.S. PATENT DOCUMENTS

| | | | |
|---|---|---|---|
| 4,224,649 | 9/1980 | Alexandrovich | 360/128 |
| 4,602,300 | 7/1986 | Ogata et al. | 360/94 |
| 4,655,057 | 4/1987 | Derman | 360/137 |
| 4,674,000 | 6/1987 | Lee | 360/128 |
| 4,803,583 | 2/1989 | Bogdanski | 360/128 |

OTHER PUBLICATIONS

Electronic Warehouse 1989 Christmas Catalog (Copyright 1989), pp. 1,2,3, and 7.
Fisher ER-7(B) Series Mechanical Manual for Videocassette Recorder, Reference No. WM-21380, pp. 1-17 (Sep. 1987).

Primary Examiner—John H. Wolff
Assistant Examiner—Jefferson Evans
Attorney, Agent, or Firm—Basile and Hanlon

[57] ABSTRACT

A service jig for enabling technicians to more efficiently and easily inspect and repair VHS conventional video cassette recorders in need of service. The jig or service cassette, as it is sometimes called, is an E-shaped structure that, when inserted into a conventional VCR, simulates the presence of a conventional VHS tape cassette, thus allowing a service technician to put the VCR into any one of its normal operating modes and observe the operation of mechanisms internal to the recorder that are normally obscured by a regular cassette. The service jig is of a substantially open design which allows almost completely free access to the tape loop area of the tape handling system of the VCR. The central horizontal arm of the E-shaped structure safely actuates the top "cassette inserted" switch found a number of VCR models. The two horizontal end arms of the E-shaped structure block the light beam used in a number of VCRs to check for the presence of magnetic recording tape, so that such VCR units can be placed into play or record mode when the service jig is inserted within it in operating position. Two different mechanisms are also disclosed and used as part of the service jig for simulating the opening of the tape cover door of a conventional VHS cassette in a manner compatible with newer VCR models.

20 Claims, 3 Drawing Sheets

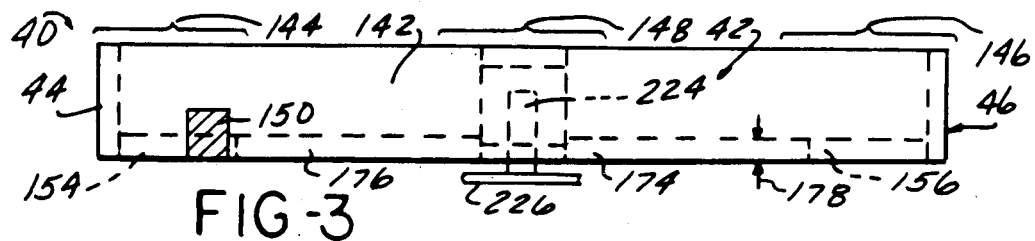
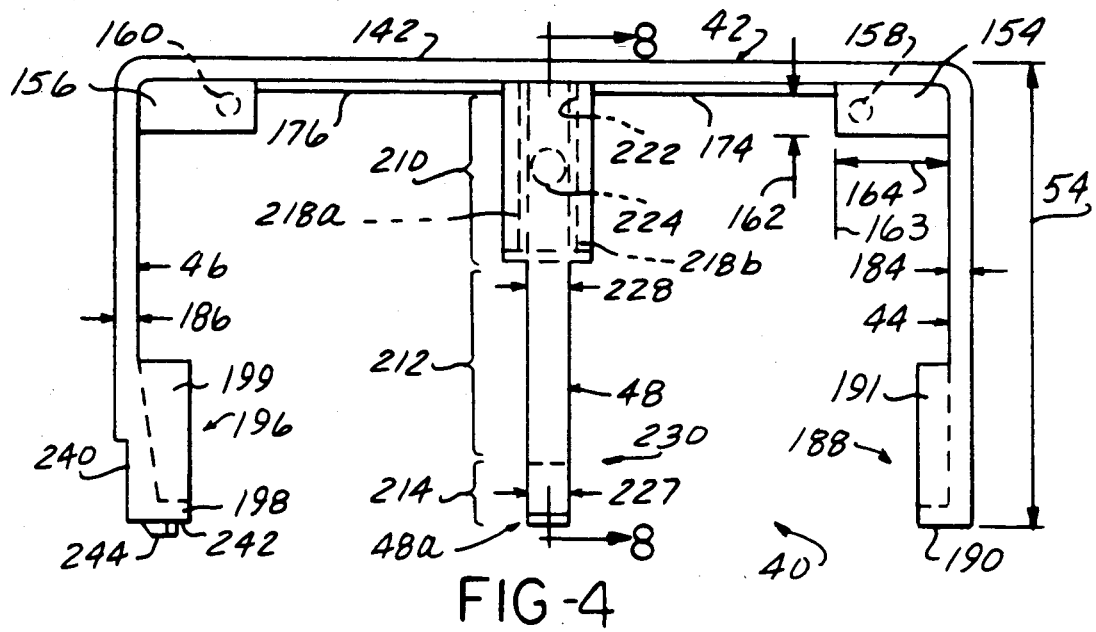
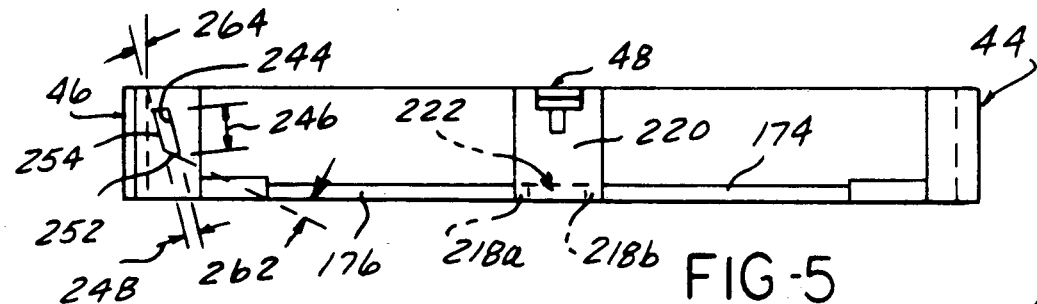
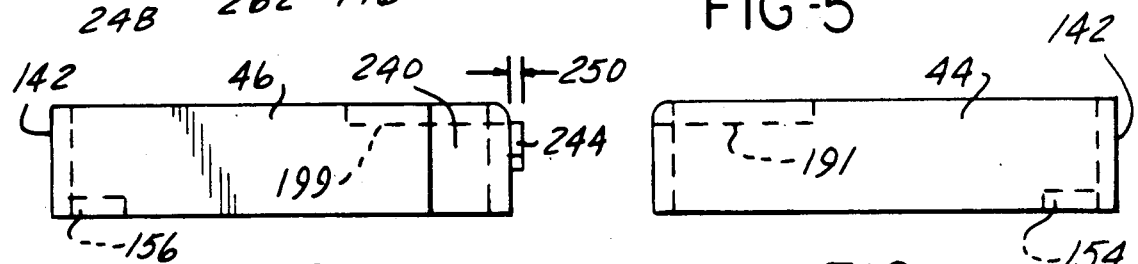
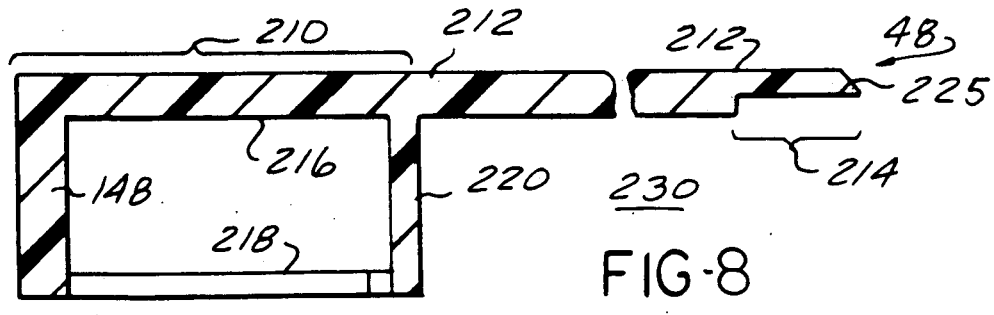

SERVICE CASSETTE FOR VHS VIDEO CASSETTE RECORDER

BACKGROUND OF THE INVENTION

1. Field of the Invention

The present invention relates in general to VHS video cassette service equipment, and in particular to VHS video service jigs or cassettes that simulate selected functions of a genuine cassette in ways helpful to a VCR service technician.

2. Description of Related Art

More than thirty-five million video cassette recorders, or VCRs as they are often called, are in use in the United States, and tens of millions of other VCRs are in use in other countries throughout the world. Almost all of these units will require some sort of maintenance or service, if used for a sufficiently long time.

Videotape recording formats used in the United States include the VHS format, the Beta format and the 8 millimeter format. The VHS format is the most popular format, and VCRs for the VHS format are made by the greatest number of manufacturers. The dimensions and operation of both the Beta format and 8 millimeter format video cassette recorders are substantially different. The service cassettes of the present invention is focused upon VHS format VCRs and thus the other formats will not be discussed.

Japanese companies that actually manufacture VCRs for VHS format include NEC, Hitachi, Matsushita, Mitsubishi, Sanyo, Sony and others. Korean companies which manufacture VCRs for the VHS format include Samsung and others. Many VCRs made by these Japanese companies are sold under private labels of still other companies. The VCRs for which play the VHS format all accept a standard size tape cassette familiar to all individuals who have used or service a VHS video cassette recorder. Hundreds of millions of these cassettes have been produced and sold, many as blank tapes for home or professional recording purposes, and still many others for use with prerecorded video material from commercial sources such as Hollywood film studios and music videos. VHS tape cassettes have gained wide acceptance since they provide a convenient, rugged, tamper-resistant protective casing for the spool of 0.5 inch (1.3 cm) wide magnetic tape wound on a pair of supply and takeup reels. The magnetic tape is normally provided with a clear leader and a clear trailer, each of which are several inches in length. These clear leader and trailer portions have the same general dimensions and flexibility as the other part of the tape, but lack the magnetic recording material, such as a ferrous oxide coating, normally found on the rest of the tape. The clear leaders and trailers are substantially transparent and therefore allow light to shine therethrough, while the other portions of the tape containing magnetic recording material are substantially opaque and block a beam of light. The presence or absence of the transparent leader or trailer is detected by one of two photodiodes spaced apart from one another and located next to the tape cassette handling mechanism within a VCR unit, and are used to tell the automatic tape handling equipment of the VCR when to start and stop in the various modes of operation.

All of the VCRs produced by the various manufacturers of units for VHS format will accept the standard size VHS cassette, even though the internal mechanisms within the VCR units which interact with the cassette are designed somewhat differently from manufacturer to manufacturer. There are two principal systems which interact with the standard VHS cassette, the first being in the tape loading system which transports the tape cassette into and out of the VCR, and second being the tape handling system. To load a tape cassette, the tape loading system normally transports the tape cassette horizontally in a first direction into the VCR. and then vertically downwardly to drop the tape cassette into its operating position within the VCR. To eject a tape cassette for the VCR unit, this same system raises the tape upwardly from its operating position, and then transports it horizontally in a second direction opposite the first direction.

The tape handling system, interacts with the videotape in order to perform the usual set of functions provided on most VCR units. These functions include fast forward, fast reverse, play, record, pause and stop. Several different fairly complex movements are carried out by the tape handling system in order to accomplish the foregoing functions. In particular, a portion of the tape is extracted by a pair of movable guide roller assemblies from the tape cassette when in its normal operating position. The extracted tape is wrapped in an extended arc about the circular recording drum in the play and record modes, and retracted from that position in the normal rewind sequence executed as part of the stop mode.

In order to perform a routine maintenance or other service upon the cassette transport system or the tape handling system of a VCR unit, the cover of the VCR is removed to expose these components. Then a cassette tape is inserted into the tape transport system and lowered into position, while the technician servicing the unit watches the operation of the internal components of the cassette transport system and the tape handling system. In this manner, the technician is at times able to observe or deduce the point in the operating cycle of either of these systems where some abnormality is occurring. Armed with that information, the technician can sometimes ascertain the cause or origin of the malfunction with the unit. Thereafter, the tape cassette is removed and the necessary adjustments are made. A tape cassette is once again inserted and the accuracy of the adjustments and replaced parts are then reviewed by putting the VCR unit through its paces to see whether it performs all of its functions within the tolerances set by the manufacturer's specifications.

The presence of the tape cassette within the tape transport system and/or the tape handling system obscures the technician's view of the movements and operation of a number of key components of the two systems. Thus, the technician is not always able to determine at what portion of a given cycle the conventional tape transport system or tape handling system is malfunctioning, but instead, must guess based upon the evidence before him. Also, in almost all of the VCR units, there are a number of mechanical and/or electronic alignments or adjustments which cannot be made when the tape cassette is in place in the transport system or in the tape handling system. This represents a shortcoming in the ability to efficiently, easily and reliably service VCRs in the home or at the service technician's shop.

Crestwood Products, Inc., of Des Plaines, Ill. recognized this shortcoming and offers to the VCR service trade a service cassette intended to help overcome these problems. This Crestwood Products tool is also called a VHS view-through diagnostic tool or jig that allows the operation of a VCR unit as if there were a regular cassette tape in it. In other words, the view-through tool does not include a magnetic cassette tape but instead is a plastic-injection molded frame reportedly having the same length and width as a regular VHS cassette. The unit is made of transparent plastic material, which allows the technician to see through portions of the frame and thereby determine what is going on underneath the area where a normal cassette would be positioned by the tape cassette loading system. The view-through tool includes a central member that is parallel to the left and right end walls, and is attached to the front and rear walls of the unit. The two halves enclosed by the end walls and central wall is open, except for plastic plates which contact the "cassette present" switches at the bottom of travel in the tape transport system.

In spite of its usefulness, the Crestwood service jig still has a number of drawbacks. The rear wall and central member of its frame impedes access by the technician to some components of the tape handling mechanism. Further, even though the Crestwood service jig is made of transparent plastic material, it still obscures the ability of the technician to observe components lying adjacent to it, on account of the reflective properties of the plastic and the fact that the edges do not appear to be transparent. Further, these rear wall portions and central wall portions block access to the components, as do the plates which actuate the contact switches that extend across the entire length of the bottom front of the service jig. Also, the Crestwood service cassette cannot be used with a number of newer VCR models, on account of the different mechanism used to open the tape cassette access door. Specifically, some newer VCR models made by Matsushita feature a compound-motion lever or actuator mechanism to flip open the access door of a conventional VHS tape cassette as the cassette transport system advances and lowers the VHS cassette into its operating position within the unit. Such door opening mechanisms normally require that the cassette and its access door go through a predetermined pattern of movement and the door provide a predetermined range of resistance which signifies that the door has been successfully contacted and is being flipped open. The Crestwood service jig has no provision for simulating this door opening function, and accordingly cannot be used to service these later Matsushita VHS models. Further, the lip in the front center of the Crestwood jig does not successfully operate all models of the top mechanical "cassette inserted" switch found in such VCR models as the Sharp and the Samsung VHS units.

In light of the foregoing limitations of the Crestwood Products service jig and in order to advance the state of the art for servicing VHS VCRs, it is an object of the present invention to provide a service jig which is easy to use and works safely with virtually all makes and models of VHS VCRs, including the newer models made by Matsushita, and allows such VCRs to be placed in any normal mode of operation. Newer models made by Matsushita are sold under the labels of other companies including Panasonic, Quasar, GE, RCA, Sylvania, Magnavox, Philco, Philips (USA) and Technics.

It is a related object of the present invention to provide a service jig with a entirely open tape loop area, which still simulates the placement of a normal video cassette into the VCR.

It is yet another object of the present invention to provide a service jig which safely operates the top "cassette inserted" switch of all of the VCR units which have them.

It is a further object of the present invention to provide a service jig with a compact, reliable mechanism that simulates the operation of a front cover of a tape cassette flipping over upon being advanced and lowered into operating position within a VCR unit.

SUMMARY OF THE INVENTION

In light of the foregoing problems and in order to fulfill one or more of the foregoing objects, there is provided, in accordance with the first aspect of the present invention a service jig for simulating the presence of a conventional VHS videotape cassette within a video cassette recorder designed to record or play such VHS cassettes. The service jig comprises: an E-shaped structure having an elongated common wall portion with first and second end regions and a central region located midway between the first and second end regions; first and second end wall portions respectively connected to the first and second end regions of a common wall portion; and a central arm portion extending from the central region of the common wall portion. The overall length, width and height of the E-shape structure is substantially equal to the overall length, width and height of a conventional VHS videotape cassette. The service jig or cassette of the present invention preferably includes means for simulating the resistance provided by and relative motion associated with properly opening a conventional pivotally mounted access or cover door on a VHS tape cassette for use in a VCR having lever means for engaging and flipping open such cover doors. The engagement and flipping of the cover door is accomplished upon insertion of the conventional VHS video cassette into such a videotape cassette recorder.

According to a second aspect of the invention, there is provided a service cassette or service jig that, when inserted into a conventional video cassette recorder ("VCR"), simulates the presence of a conventional VHS tape cassette, and thereby allows a service technician to put the VCR into any one of its normal operating modes and readily observe the internal operation of the VCR's tape cassette loading and tape handling systems that are normally obscured by conventional video cassette containing magnetic recording tape. This service jig comprises a substantially open structure having an elongated common member and two elongated end arm members that each extend perpendicularly from and are rigidly connected to the common member. The open structure also includes a central arm member that extends outwardly from, parallel to and is substantially equidistant from the end arm members. The structure and its members are arranged to provide a substantially open area that extends between the distal ends of the end arm members and underneath a distal end of the central arm member. This open area allows almost completely unobstructed access to the tape loop area of a tape handling system of the VCR even when the service jig is in the normal operating position for a VHS tape cassette of the VCR. This service jig preferably includes means, on the distal unsupported ends of each of the two end arm members, for blocking the transmission of a conventional directed light beams used in all conventional video cassette recorders to detect the presence or absence of opaque magnetic recording tape within a conventional VHS videotape cassette.

In accordance with a third aspect of the present invention, there is provided a service jig for simulating the presence of a conventional VHS tape cassette in a VCR to thereby allow a service technician to put the VCR in one or more operating modes and observe the operation of mechanisms internal to the VCR that are normally obscured by a conventional video cassette containing magnetic recording tape. This service jig comprises a frame structure having at least a common member and two end members that each extend perpendicularly from and are rigidly connected to the end regions of the common member. The structure is provided with at least one substantially open area between the end arm members that allows significant access to the tape handling system of the VCR even when the service jig is in the normal operating position for a VHS tape cassette of the VCR. The service jig also includes means for simulating the resistance provided by and relative motion associated with properly opening a conventional pivotally mounted cover door on the video cassette recorder in a VCR that has actuator means for engaging and flipping open such a cover door upon insertion of a conventional VHS video cassette into the VCR and the transporting of such a cassette to its normal operating position within the VCR. This means for simulating may constitute a protruding block of relatively hard material having at least one predetermined curved surface for guiding the means for engaging and flipping in essentially the same manner as a conventional VHS tape cassette having a conventional pivotally mounted access door would do. Alternatively, this means for simulating may include at the unsupported distal end of one of the arm members, a flexible strip of material arranged in a diagonal position when at rest. This strip of material will bend in response to force applied thereto by at least one lever means for engaging and opening a conventional pivotally mounted cassette door of a conventional VHS tape cassette when such cassette is used in the VCR.

These and other objects, advantages and aspects of the present invention may be further understood by referring to the detailed description, accompanying Figures, and appended claims.

BRIEF DESCRIPTION OF THE DRAWINGS

The drawings form an integral part of the description of the preferred embodiments and are to be read in conjunction therewith. Like reference numerals designate the same or similar components or features in the various Figures, where:

FIGS. 3 through 8 show the service jig of the present invention from different vantage points, where FIG. 3 is a first side view, FIG. 4 is a top view, FIG. 5 is a second side view, FIG. 6 is a right end view, FIG. 7 is a left end view, and FIG. 8 is an enlarged cross-sectional view of the central arm taken along line 8—8 of the FIG. 1 devices.

DETAILED DESCRIPTION OF THE PREFERRED EMBODIMENTS

Figure 1:
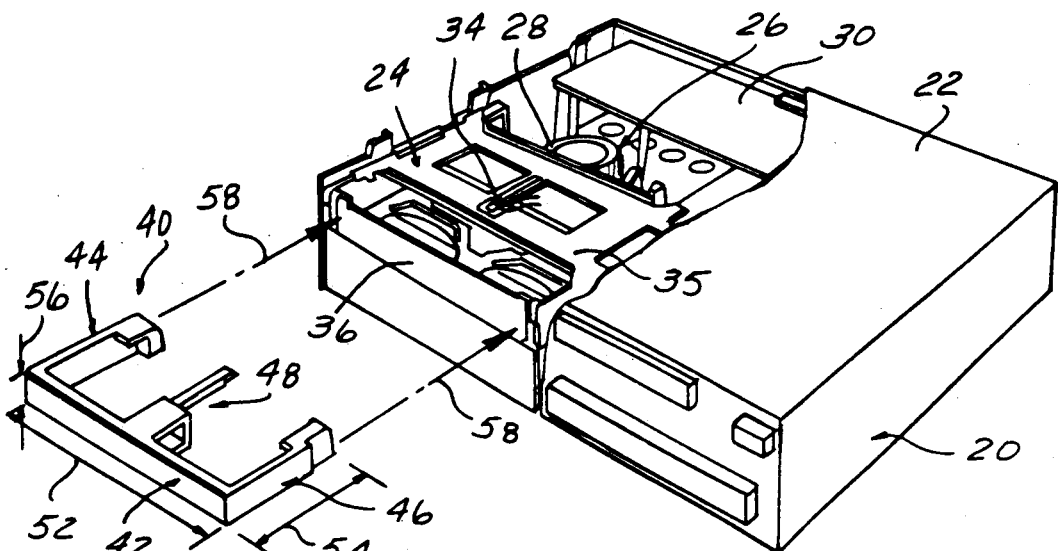
FIG. 1 is a perspective view of a conventional VHS video cassette recorder ("VCR") shown partially broken away with the E-shaped VHS service jig of the present invention poised for insertion into the cassette handling assembly of the VCR.

In FIG. 1 there is shown a conventional VHS video cassette recorder ("VCR") 20 having a rectangular box-like cover 22 shown partially broken away to partially reveal the tape cassette loading system 24 and tape handling system 26 including recording head drum assembly 28, printed circuit board 30 and other components within the VCR. The cassette loading system 24 includes a top "cassette inserted" switch 34 mounted to a sheet metal structure 35 and other components which will be described in more detail later.

FIG. 1 also shows the service jig 40 of the present invention, as a rectangular frame structure resembling the letter "E." The service jig 40, which does not hold any videotape, has an elongated common wall portion 42, first and second end wall portions 44 and 46, and a central arm portion 48. The overall length, width and height, indicated by reference numerals 52, 54 and 56, are substantially equal to the overall length, width and height of a conventional videotape cassette. In other words, the overall length 52, width 54 and height 56 are respectively about 18.7 centimeters ("cm"), about 10.2 cm and about 2.5 cm. The service jig 40 is inserted into and through the door 36 of tape loading system 24, just like a conventional VHS cassette, as is indicated by arrows 58, and is internally handled by the VCR 20 just like a conventional video cassette.

Figure 2:
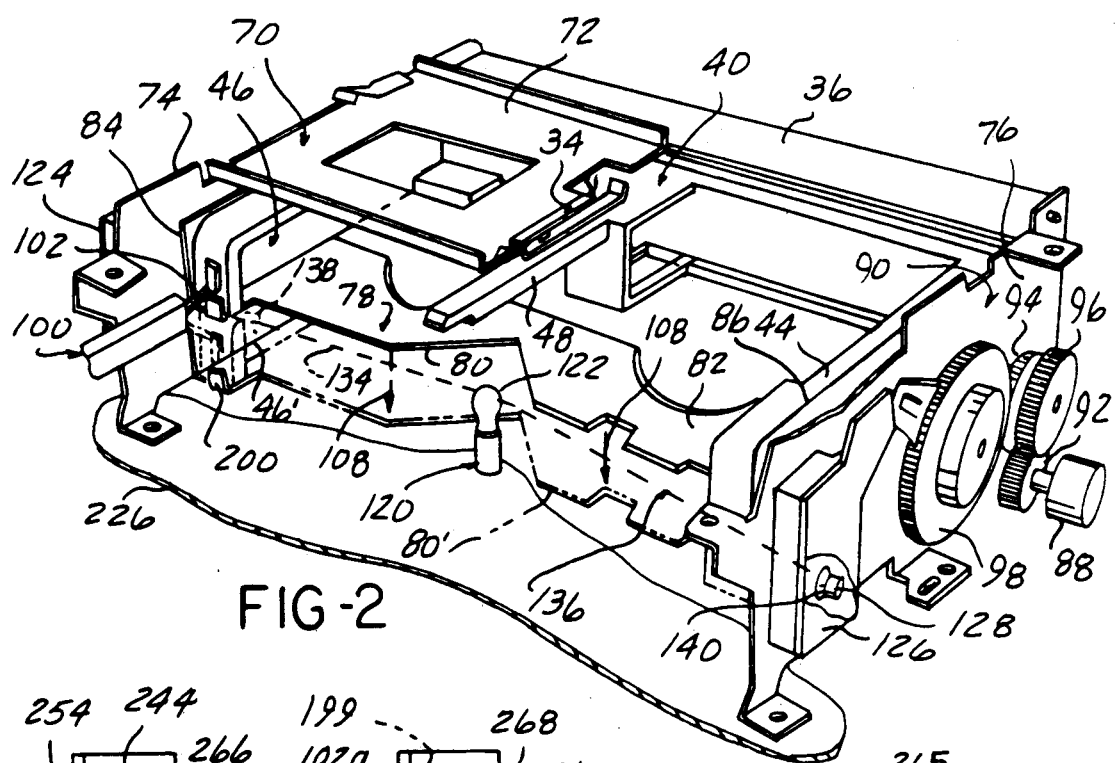
FIG. 2 is an enlarged simplified perspective view of a conventional cassette handling assembly into which the VHS service jig of the present invention has been inserted.

FIG. 2 shows one conventional tape cassette loading system 24 used within a VCR 20 into which the service jig 40 has been placed. The loading system 24 includes a sheet-metal frame 70 including top member 72 (shown partially broken away) and first and second side wall members 74 and 76. The tape cassette loading system 24 also includes a movable cassette drawer or tray 78 which includes a sheet-metal frame 80 comprised of a horizontal frame member 82 and two vertical side wall members 84 and 86 located on opposite ends of horizontal member 82. The cassette loading system 24 also includes an electric drive motor 88 which may be dedicated to the tape loading system, or may be used for other purposes such as to drive the tape handling system, depending upon the particular make or model of VCR. The tape handling system 26 typically includes a gear set 90 on one or both side walls 74 and 76 of the frame 70, which may include two or more meshing gears such as drive gear 92, connecting gears 94 and 96 and aim gear 98. The tape loading system 24 may optionally include (typically only on newer models), a compound-motion lever assembly or actuator mechanism including a lever or actuator 102 which is used to engage and flip open the access door of a conventional video cassette. For example, in the recent Matsushita models, such a mechanism 100 and actuator 102 are employed.

Also shown in FIG. 2 is a preferred embodiment of the service jig 40 of the present invention sitting upon the drawer 78 when the drawer is in its fully forward position. In operation, the gear set 90, under the power provided by electric motor 88, causes the drawer 78 to advance horizontally to the position shown in FIG. 2 and then drop as shown by the dotted arrows 108 down to the phantom position indicated by the drawer frame 80' and service jig 40'.

The design and construction of the tape loading system 26 and the motion produced thereby are well known to those skilled in the art, and will not be discussed further here, except where pertinent to better explain the service jig of the present invention.

Typically, a conventional VCR includes as part of the controls for the tape handling system, a light source 120 which may include a light-emitting diode, neon bulb or other light 122, and a pair of photodetector assemblies 124 and 126, each including a photodetector such as photodiode 128. As is well known, the purpose of the light source 120 and photodetectors 124 and 126 is to determine when the spool of tape in a conventional videotape cassette is at its beginning or at its end. Two beams of light 134 and 136 emanate through light passages within a conventional video cassette, and then through apertures 138 and 140 in the side frame members 74 and 76, to the photodetectors 128.

FIG. 2 and FIGS. 2A through 2D show in further detail the design and construction of the means for simulating the resistance and relative movement provided by a pivotally mounted access door in a conventional VHS tape cassette. These means will be described in detail later.

FIGS. 3 through 8 show various views of a preferred embodiment of the service jig 40 of the present invention. FIG. 3 shows the common wall portion 42 of the jig 40, which has first and second end regions 144 and 146, and a central region 148 located midway between the first and second end regions. The shaded area 150 is where the record lock-out tab would be located on the conventional video cassette. As is well known, such a tab may be broken off to prevent recording. In the preferred embodiment of the present invention, the entire exterior surface 142 of elongated common wall portion 42 is solid, including area 150. Making area 150 solid helps ensure that when service jig 40 is placed inside a VCR, the VCR can enter in its record mode.

FIG. 4 shows the service jig 40 from the top, which reveals further details. The service jig 40 includes stationary pads 154 and 156 respectively located in the interior corners formed by the meeting of the common wall portion 42 and the end wall portions 44 and 46. The pads 154 and 156 constitute first and second means for actuating cassette-in-position switches, represented by circles 158 and 160 shown in phantom in FIG. 4, found underneath the frame 70 of the tape handling system in almost all VCRs. The switches 158 and 160 when activated, tell the VCR that a conventional video cassette has been properly lowered to the operating position by the tape handling drawer 80. In the preferred embodiment, the size of pads 154 and 160 are approximately 1 cm wide (as indicated by dimension 162) and have a length of 1 cm to 3 cm, as measured from line 163 (and as indicated by dimension 164). In other words, the pads 154 and 156 may be as small as about 1 cm square, but also may have a length which extends to the adjacent end wall as shown for further rigidity.

The common wall portion 42 may also include strengthening ribs 174 and 176, if desired, to provide additional rigidity against flexing in the direction perpendicular to the plane of exterior surface 142. As may be seen in FIG. 3, the thickness 178 of such ribs may be made identical to the contact pads 154 and 156. A suitable range of dimensions for the thickness of each of these ribs is 0.2 cm to 0.6 cm.

In FIG. 4, the first and second end wall portions 44 and 46 are shown to have a substantially uniform thickness over most of their length, which thickness as indicated by dimensions 184 and 186 may range, for example, from about 0.2 cm to about 0.5 cm. The first end arm portion 44 terminates at distal end 188 with a short wall portion 190 and a roof portion 191 extending at right angles to the rest of arm 44, as shown. The second end arm portion 46 terminates at its distal end 196 which also includes a wall portion 198 and a roof portion 199 extending at right angles to the rest of the arm 46. The overall width, that is dimension 54 shown in FIG. 1, is set by the length of arm 44 and 46. The terminal portions 190 and 198 of end arms 44 and 46 butt against stop pads of the drawer 78, such as pad 200 which may be seen in the left-hand side of FIG. 2. The roof portions 191 and 199 also contact guides or leaf springs (not shown) that extend down from the top member 72 of the frame 70, which are typically provided as part of the frame 70 in a conventional VCR. Thus, roof portions 191 and 199 serve to help ensure that service jig 40 is correctly positioned within the drawer 78 of the cassette handling system, just like a conventional video cassette.

The preferred structure of central arm portion 48 of the E-shaped service jig structure 40 may be fully understood by reference to FIGS. 3 through 5 and 8. The purpose of central arm 48 is to safely and reliably actuate any centrally-located top cassette-inserted switch, such as the switch 34 shown in FIGS. 1 and 2. The actuation of this top switch 34 is normally accomplished by the leading top edge and top planar surface of a conventional video cassette. In the service jig 40 of the present invention, this same result is achieved by a thin, substantially rigid arm 48 which has been designed so as to minimize visual and mechanical obstruction of the tape loop area, as will be further explained below. As may be seen in FIG. 4, the central arm 48 is comprised of first, second and third regions 210, 212 and 214 arranged in line with one another so that the arm 48 is perpendicular to the wall 142 of common wall portion 42. As best seen in FIG. 8, the first region 210 has upper and lower sections 216 and 218 rigidly connected to the central region 148 on the common wall portion 42, and has an intermediate support section 220 extending between the upper and lower sections 216 and 218. The lower section 218 includes a preferably rectangular orifice 222 for receiving therethrough a conventional locator post 224 rigidly connected to the chassis 226 of the VCR 20.

The second region 212 of central arm 48 is rigidly connected to and extends outwardly from the upper section 216 of the first region 210, and is configured as a single, substantially planar member which may have a rectangular cross-section. The third region 214 is rigidly connected to and extends outwardly from the second region and is the unsupported distal end of the arm 48. The third region 214 has an upwardly beveled surface 225 as shown for safely actuating the top cassette-inserted switches found in many models of VCRs as part of the tape cassette loading system 24. Region 214 need not be as thick as region 212, since such extra strength is not necessary at that point. Further, the regions 212 and 214 may be tapered so that the distal end dimension 227 is less than the base dimension 228 (see FIG. 4). Thus, section 218 is preferably comprised of two elongated members 218a and 218b which define the sides of rectangular orifice 222. If desired, the lower section 218 could be made out of a solid piece of material having a hole approximately 1 cm in diameter for the locator post 224 to project through. However, the much larger rectangular orifice 222 is preferred since it provides greater visibility and access to the area therebelow. Alternatively, to simplify manufacture by plastic injection molding techniques, the members 218a and 218b could extend upwardly all the way to upper section 216. As a further variation, the service jig of the present invention could have the arm 48 formed as a large rectangle with the vertical support 220 located near the distal end of the arm. However, this would undesirably impede visibility and access to the area beneath regions 212 and 214, which is undesirable. One of the significant benefits of the service jig 40 of the present invention is that it provides a means for reliably actuating the top cassette-inserted switch while still providing a substantially open central area 230 under the second and third portions 212 and 214 of central arm 48. This area 230 is centrally located within the tape loop area of a conventional cassette, and is an area where it is important to have maximum visibility during maintenance and repair procedures.

FIGS. 4, 5 and 6 show the construction for the end portion 196 of arm 46. The end region 196 includes a notched area 240 representing the space where one edge and a conventional pivot mechanism of a hinged access door of a conventional video cassette would be located, for those VCR units which require that such clearance be present. The exterior surface 242 of end wall 198 includes a protrusion or block of hard material 244 specially shaped to engage the lever or actuator 102 of the door-opening mechanism 100 previously described with respect to FIG. 2 As shown in FIG. 5, the block 244 is approximately 1 cm long as indicated by dimension 246 and has an average width of about 0.3 cm to 0.4 cm wide as indicated dimension 248. The thickness of block 244 is preferably about 0.2 cm to 0.3 cm as indicated by dimension 250 in FIG. 6. The block 244 has two sloping surfaces 252 and 254 upon which ride the tip 102a of lever 102 of the door-opening mechanism found in recent models of VCRs produced by Matsushita. Surface 254 is slightly bowed inwardly, so that it has a slightly concave profile, as shown. The angles 262 and 264 of the surfaces 252 and 254 respectively are approximately 30 to 45 degrees from the horizontal and approximately 20 to 35 degrees from the vertical. Angles within the foregoing ranges are believed to provide the right amount of resistance to the tip of lever 102 on a smooth plastic surface to repeatably and accurately simulate the resistance and relative motion with properly opening a conventional pivotally mounted cover door on a VHS video cassette in a conventional VCR, such as the aforementioned Matsushita models having a lever means for engaging and flipping open such cover doors upon insertion of such video cassette into such a VCR.

Figure 2A:
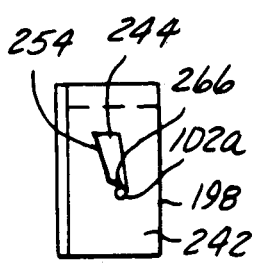
FIGS. 2A and 2B are detail views of a first embodiment of the end of the rightmost arm of FIG. 1 service jig.
Figure 2B:
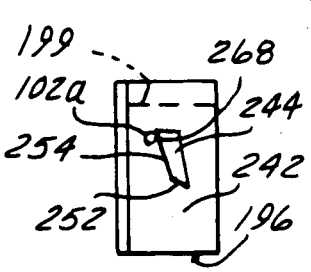

FIGS. 2, 2A and 2B show the beginning and ending positions 266 and 268 of the tip 102a of lever 102 as it contacts and follows along the curves 252 and 254. Initially, the cassette drawer 78 is partially advanced and the tip 102a of the lever 102 makes contact with the bottom portion of the diagonal surface 252, i.e., at location 266, indicated in FIG. 2A. Thereafter, upon further rotation of gear set 90, the cassette drawer 78 advances to the position shown in solid lines in FIG. 2 and then the drawer is lowered to the position indicated in FIG. 2B. As this occurs, the tip 102a moves upwardly along diagonal surface 252 and then along diagonal surface 254, and ultimately ends up at position 268 at the top of surface 254, as indicated in FIG. 2B. In practice, the mechanism 100 and its lever 102 are moved both in the horizontal and vertical directions by the tape loading mechanism, at least in the recent models of VCRs by Matsushita. Accordingly, it may be said that the actuator means for engaging and flipping open such a cassette cover door executes a compound motion, while the tip 102a of lever 102 moves through the path just described.

Figures 2C, 2D:
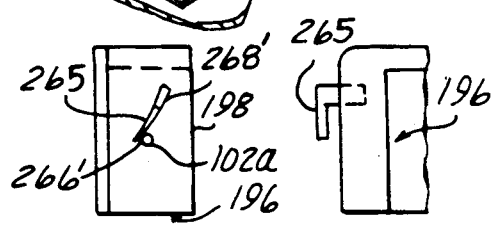
FIGS. 2C and 2D are front and side detail views of a second embodiment of the rightmost arm of the FIG. 1 service jig.

FIGS. 2C and 2D show another embodiment of the means for simulating the resistance provided by and relative motion associated with properly opening a conventional pivotally mounted covered door on a VHS videotape cassette for a conventional VCR having compound motion actuator means of the type just described. The distal end 196 of end arm 46 is the same as shown in FIGS. 2A and 2B, except that instead of the block 244, there is provided a strip of flexible material 264 configured as shown in FIGS. 2C and 2D which is inserted into and anchored by epoxy or by a complementary snug hole in the exterior face of horizontal segment 198 of the arm 46, as shown in FIG. 2D. The flexible strip 265 may be made out of spring steel, semi-rigid plastic material or other pliant material that has the capability of elastically flexing at least 20 degrees in response to forces exerted by the tip 102a of lever 102. The tip 102a begins at the lower end 266' of the flexible strip 265 and as the cassette drawer 78 drops into position, the tip 102a advances to the location 268'. The precise angle required of the flexible strip 265 is a function of its flexibility and the frictional resistance provided by its surface to the tip 102a of lever 102. In prototypes of this embodiment of the door-opening simulator of the present invention, the average angle was in the range of about 30 degrees to about 55 degrees from the vertical for a flexible strip of nylon or similarly semi-rigid plastic having an overall free length of about 1 cm, a width of about 0.2 cm, and an average thickness of about 0.05 to about 0.075 cm.

The service jig 40 of the present invention may be made from any suitably rigid material, including almost any conventional impact-resistant plastic material out of which enclosures for conventional video cassettes are made. Suitable high-strength polymeric materials include ABS, class A sheet molding materials, plastic-injection molding materials including nylon, PVC materials, and the like. The material is preferably fairly smooth and preferably is electrically nonconductive. If desired, a metallic wire frame having an E-shaped configuration may be employed, provided that the wire frame is coated or has molded thereupon a final coating of an electrically insulating smooth material.

The overall weight of the service jig 40 may be varied as desired, such as in the range from about 75 grams up to 500 grams or more. Preferably the service jig has an overall weight in the range of about 150 grams to about 400 grams, with the most preferred range being about 200 grams to about 300 grams, since this simulates the overall weight of average cassette loaded with the usual amount of videotape. If necessary, the average thickness of the walls of the common or end wall portions may be decreased or increased to achieve the desired weight.

Figure 9:
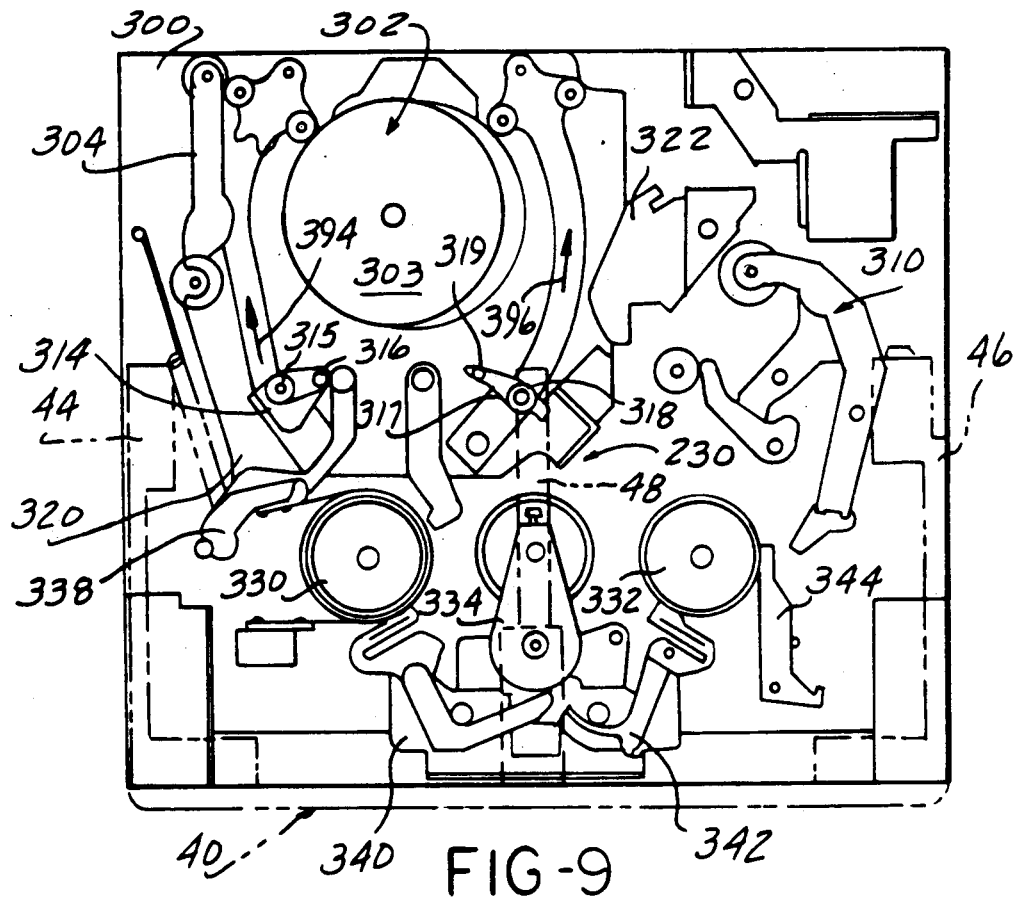
FIG. 9 is a simplified plan view of a tape cassette handling assembly of a conventional VCR with the service jig of the present invention shown in position in phantom, and the tape handling mechanisms therein shown in their retracted position.
Figure 10:
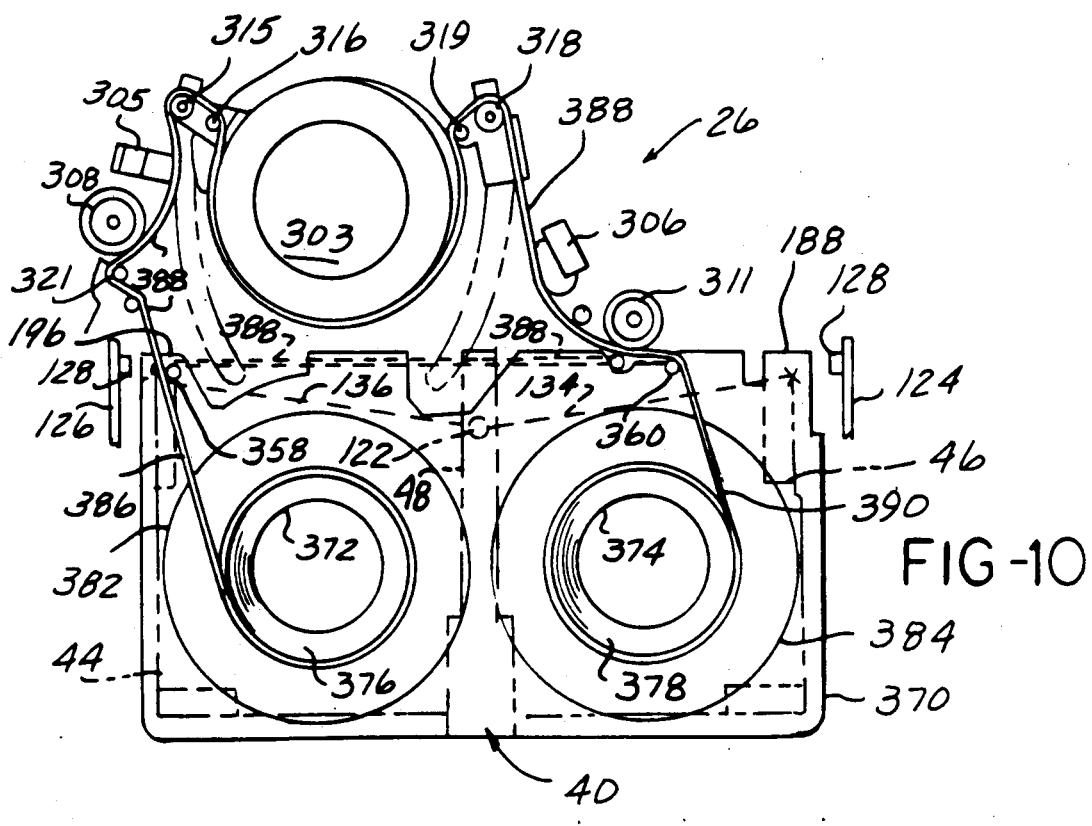
FIG. 10 is a diagram showing the path in a conventional VCR for VHS format magnetic tape, which shows the tape handling mechanisms of FIG. 9 in their extended or play position, and which shows the service jig of the present invention overlaid in phantom.

The advantages of the service jig 40 of the present invention will now be explained with reference to FIGS. 9 and 10. FIG. 9 shows a simplified plan view of one conventional VHS tape handling system found in a conventional VCR, such as the Fisher Corporation Model ER-7(B) Series. The various components and maintenance procedures for this VCR are described in the Fisher Reference Manual No. WM-12380, available from SFS Corporation of Comption, Calif. Readers desiring further details of the mechanical construction operation of the diagram shown in FIGS. 9 and 10 should refer to this manual. FIG. 9 shows various major components found in the tape handling system 26 of a conventional VCR in their at-rest or retracted position, while FIG. 10 shows many of these same components in their extended or advanced position. The tape handling system 26 is normally mounted on its own chassis 300 and typically includes the following major assemblies: a recording head drum assembly 302 with recording/play head 303; full erase head assembly 304 with erase head 305 and audio control erase head assembly 306 (shown in FIG. 10); tape guide roller assembly 308 and pinch roller assembly 310 (also shown in FIG. 10); supply guide roller assembly 314 including roller 315 and angle pole 316 and take-up guide roller base assembly 317 arranged on either side of the recording head 302; loading base assembly 320 and tape guide assembly 322. Major mechanisms for winding up a videotape within a tape cassette in either direction and visible in FIGS. 9 and 10 include: the supply wheel assembly 330; the take-up reel assembly 332; the idler hold arm assembly 334; the tension arm/band assembly 338; the supply bracket assembly 340; the take-up bracket assembly 342 and the actuator plate assembly 344. Also, within a conventional video cassette, idler rollers 358 and 360 are provided to guide the path of the cassette tape as it is fed in forward and reverse directions.

In the normal operation of a VCR, the tape-handling components start out in the at-rest positions shown in FIG. 9. A conventional VHS video cassette when in operating position within a VCR has its supply and take-up reels engaged in complementary supply and take-up reel gears forming part of supply reel assembly 330 and take-up reel assembly 332. FIG. 10 shows in simplified form the generally rectangular outline 370 of a conventional VHS cassette having supply and take-up spools 372 and 374 which each have some magnetic tape 376 and 378 wound thereupon within the confines of circularly-shaped supply reel casement 382 and take-up reel casement 384. A loop of magnetic tape including portions 386, 388 (shown in phantom) and 390 depict how the tape starts out when the conventional cassette 370 is first placed in operating position by the cassette loading system 24. Once the VCR 20 commands the tape handling system 26 to actuate and place the loop 388 of tape in its normal operating position about the recording drum 303 of drum assembly 302, the supply guide roller 315 and angle pole 316, and the take-up guide roller 318 and angle pole 319 move from their at-rest position in the direction of arrows 394 and 396 respectively to the positions shown in FIG. 10, thereby causing the portion 388 of tape shown in phantom in FIG. 10 to wrap around the head 303 and other components as is shown by the solid lines 388.

As may be seen by FIGS. 9 and 10, the conventional combination of gears, rollers, guides and levers which make all of this happen is quite complex and the VCR is subject to malfunction if any critical component should be out of alignment or excessively worn. Thus, in order to facilitate the ability of a service technician to inspect the unit for malfunctions or test the unit for proper operation, it is very useful to allow the service technician to see as much of the mechanical action and positioning of the various components as possible, and to be able to reach them. The service jig 40 of the present invention does this to virtually the maximum extent possible, while simulating the presence of a conventional VHS videotape cassette to allow the VCR to function in all of its normal operating modes. The E-shaped service jig 40 of the present invention also provides a substantially open area for tape loop 388 between the end arm members 44 and 46 that allows significant and substantially unobstructed access to the tape handling system of the VCR even when the service jig is in a normal operating position for VHS tape cassette within the VCR. This is illustrated by the large open expanses of area between the central arm portion 48 and the end arm portions 44 and 46 shown in phantom in FIG. 9. Also, those in the art will appreciate that the area 230 underneath the second and third regions 212 and 214 of central arm 48 is also open, which allows the service technician to view any mechanisms thereunder and to insert inspection probes or adjustment tools into this area to make any necessary inspections or adjustments.

In FIG. 10, the E-shaped service jig 40 is also shown overlaid upon the outline 370 of a conventional cassette for easy reference. The light source 122 and photodetectors 128 and the light beam paths 134 and 136 are also shown for convenient reference. As may be seen in FIG. 10, the end regions 188 and 196 of the end arms 44 and 46 block the light beams 134 and 136. This occurs by making at least the end regions 188 and 196 of material which is opaque to the transmission of light at the wavelengths emitted by light source 120. When the beams are blocked, the photodetectors 128 inform the VCR circuitry that magnetic recording tape is present. Thus, when the service jig 40 is in a VCR, it may be placed in any of the operating modes, Including record, play, fast forward, fast reverse and pause. Thus, all modes of operation of the VCR may be successfully checked out by the service technician using service jig 40.

The foregoing detailed description shows that the preferred embodiments of the present invention are well suited to fulfill the objects above-stated. It is recognized that those skilled in the art may make various modifications or additions to the preferred embodiments chosen to illustrate the present invention without departing from the spirit and proper scope of the invention. As a first example, the inner surfaces of end arm portions 44 and 46 could be somewhat arcuate rather than substantially flat. As a second example, the E-shaped structure may be made of transparent plastic material with only end regions 188 and 196 being made of or covered with opaque light-blocking material. As a example, the means for simulating the opening of the cover door of a conventional video cassette may be varied, such as providing a mock door which is pivotally connected in conventional manner to the end region 196 of the end arm portion 46, but extends no further than the other side of the same arm. A very light torsion spring or leaf spring could be added if desired to this mock door to simulate the precise weight of a conventional cover door. Also, open rather than closed common wall portion and end wall or arm portions may be utilized. These surfaces could be made of a lightweight substantially open plastic-coated steel wire framework, which would still have the outline of the E-shaped structure of the service jig, so that the overall dimensions of the service jig would still be accurate, with a solid wall or face of material being placed only where needed for strength, or to interact with the operator of an electrical position switch or a locator/positioning device of the tape loading or handling systems. Accordingly, it is to be understood that the protection sought and to be afforded hereby should be deemed to extend to the subject matter defined by the appended claims, including all fair equivalents thereof.

I claim:

1. A service jig for simulating the presence of a conventional VHS videotape cassette within a video cassette recorder ("VCR") designed to record or play such VHS cassettes, thereby allowing a service technician to put the VCR into virtually all of its normal operating modes and to readily observe the operation of internal mechanisms of the VCR that are normally obscured by the presence of a conventional video cassette within the VCR, the service jig comprising:

a substantially open E-shaped structure having an elongated common wall portion with first and second end regions and a central region located midway between the first and second end regions, first and second end wall portions respectively connected rigidly to the first and second end regions of the common wall portion and extending substantially perpendicularly away therefrom, and a central arm portion rigidly connected to and extending away from the central region of the common wall portion, the first and second end wall portions and the central arm portion being substantially unconnected to one another, except along the elongated common wall portion, such that the end wall portions provide no support for one another and provide no support for the central arm portion, the overall length, width and height of the E-shaped structure being substantially equal to the overall length, width and height of a conventional VHS videotape cassette, whereby the service the service jig provides an open viewing area that allows almost completely unobstructed visual and mechanical access to tape loop areas of a tape handling system of the VCR, even when the service jig is in a normal operating position for a conventional tape cassette of the VCR.

2. A service jig as in claim 1 wherein overall length, width and height of the E-shaped structure are respectively about 18.7 cm, about 10.2 cm and about 2.5 cm.

3. A service jig as in claim 1, wherein:

the central arm portion includes first, second and third regions generally in line with one another and arranged perpendicularly to the central region of the common wall portion, the first region having upper and lower sections rigidly connected to the central region of the common wall portion and intermediate support section extending between the upper and lower sections, the lower section including an orifice for receiving therethrough a conventional locator post on a video cassette recorder, the second region rigidly connected to and extending outwardly from the upper section of the first region and configured as a single substantially planar member, the third region rigidly connected to and extending outwardly from the second region and terminating at an unsupported free end thereof which has an upwardly beveled surface for safely actuating cassette-inserted switches found in some conventional VHS video cassette recorders.

4. A service jig as in claim 1, further comprising:

means for simulating the resistance provided by and relative motion associated with properly opening a conventional pivotally mounted cover door on a conventional VHS video cassette in a conventional VCR having lever means for engaging and flipping open such cover doors upon insertion such video cassette into such a VCR.

5. A service jig as in claim 4, wherein:

the first end wall portion includes first and second regions generally in line with one another and arranged perpendicularly to the central region of the central region of the common wall portion, and the first region being rigidly connected to the first end region of the common wall portion, the second region being rigidly connected to the first region and supporting the means for simulating.

6. A service jig as in claim 1, further comprising:

first means for actuating a first cassette-in-position switch in a conventional VCR, located adjacent to a corner formed by meeting the first end wall portion and the common wall portion; and second means for actuating a second cassette-in-position switch in a conventional VCR, located adjacent to a corner formed by meeting the second end wall portion and the common wall portion.

7. A service jig as in claim 6, wherein the first and second means for actuating each include substantially planar members rigidly connected to at least one of the wall portions and arranged perpendicularly thereto.

8. A service jig as in claim 6, wherein the first and second means for actuating are each planar members rigidly connected to at least the common wall portion and extending perpendicularly outwardly therefrom, with each such planar member being approximately 1 cm wide and a length in the range of about 2.5 cm to about 4.0 cm.

9. A service jig as in claim 1, wherein the E-shaped structure is a unitary piece of molded plastic material.

10. A service jig as in claim 1, wherein:

each of the end wall portions have first and second end regions, with each such first end region being rigidly attached to the common wall portion and each such second end region being spaced apart from the common wall portion, and at least the second end region of each of the end wall portions is sufficiently opaque to block the transmission of a conventional directed light beam used in conventional video cassette recorders to detect the presence or absence of opaque magnetic recording tape within a VHS videotape cassette.

11. A service jig as in claim 1, wherein the E-shaped structure is a unitary piece of rigid material opaque to the transmission of light beams used in conventional video cassette recorders to detect the presence or absence of magnetic recording material on a flexible spool of tape within a VHS videotape cassette.

12. A service jig that, when loaded into a conventional video cassette recorder ("VCR"), simulates the presence of a conventional VHS tape cassette and thereby allows a service technician to put the VCR into virtually all of its normal operating modes and to readily observe the operation of internal mechanisms to the VCR that are normally obscured by the presence of a conventional video cassette within the VCR, the service jig comprising:
a substantially open structure having an elongated common member and two elongated end arm members that each extend perpendicularly from and are rigidly connected to the common member, and a central arm member that extends outwardly from, parallel to and is substantially equidistant from the end arm members, the two end arm members are the central arm member being substantially unconnected to one another, except along the common member, such that the end arm members provide no support for one another and provide no support for the central arm member,
the structure being arranged to provide a substantially open area that extends between distal ends of the end arm members and underneath a distal end of the central arm member,
whereby the service jig provides an open viewing area allows almost completely unobstructed visual and mechanical access to the tape loop area of a tape handling system of the VCR, even when the service jig is in the normal operating position for a VHS tape cassette of the VCR.

13. A service jig as in claim 12, further comprising:
means, on unsupported end regions of each of the two end arm members, for blocking a conventional directed light beam used in conventional video cassette recorders to detect the presence or absence of substantially opaque magnetic recording tape within a conventional VHS videotape cassette.

14. A service jig as in claim 13, wherein at least the unsupported ends of the end arm members include a material which blocks said conventional directed light beam, and such blocking material constitutes the means for blocking on each end arm member.

15. A service jig as in claim 12, further comprising:
means for actuating a centrally located upper cassette-inserted switch provided in some conventional VCRs;
means for actuating a first cassette-in-position switch in a conventional VCR when the service jig is in a normal operating position within such VCR; and
means for actuating a second cassette-in-position switch in a conventional VCR that is spaced apart from the first cassette-in-position switch when the service jig is in a normal operating position within such VCR.

16. A service jig as in claim 12, further comprising:
means for simulating the resistance provided by and relative motion associated with properly opening a conventional pivotally mounted cover door on a VHS videotape cassette in a conventional VCR having compound-motion actuator means for engaging and flipping open such a cover door upon insertion of a conventional VHS video cassette into such a video cassette recorder and the transporting of such video cassette to a normal operating position for the video cassette.

17. A service jig as in claim 16, wherein:
the first end member includes an unsupported end region spaced from the front member which supports the means for simulating.

18. A service jig that, when inserted into a conventional video cassette recorder ("VCR"), simulates the presence of a conventional VHS tape cassette and thereby allows a service technician to operate the VCR in one or more operating modes and observe the operation of mechanisms internal to the VCR that are normally obscured by the presence of a conventional video cassette, the service jig comprising:
a frame structure having at least a common member and two end members that each extend perpendicularly from and are rigidly connected to the common member, the structure having at least one substantially open area between the end members to provide an open area that allows significant access to the tape handling system of the VCR even when the service jig is in a normal operating position for a VHS tape cassette within the VCR; and
means for simulating the resistance provided by and relative motion associated with the act of properly opening a conventional pivotally mounted cover door on a video cassette recorder in a VCR having actuator means for engaging and flipping open such a cover door upon insertion of a conventional VHS video cassette into the VCR and the transporting of such a video cassette to its normal operating position within the VCR.

19. A service jig as in claim 18, wherein the means for simulating include, a block of relatively rigid material having at least one predetermined curved surface for guiding the actuator means for engaging and flipping in essentially the same path as a conventional VHS tape cassette having a conventional pivotally mounted cassette door would do.

20. A service jig as in claim 18, wherein the means for simulating include, at the unsupported free end of one of the arm members, a flexible strip of material, connected thereto and diagonally arranged when at rest, that bends in response to forces applied thereto by the actuator means for engaging and flipping a conventional pivotally-mounted cassette door of a conventional VHS tape cassette upon insertion of the service jig into and advancement of the service jig to the normal operating position for a VHS video cassette within such a VCR.

* * * * *